United States Patent
Abedini et al.

(10) Patent No.: US 11,316,781 B2
(45) Date of Patent: Apr. 26, 2022

(54) SEPARATION OF A CONTROL PLANE AND A USER PLANE FOR AN INTEGRATED ACCESS AND BACKHAUL NETWORK

(71) Applicant: QUALCOMM Incorporated, San Diego, CA (US)

(72) Inventors: Navid Abedini, Somerset, NJ (US); Karl Georg Hampel, Hoboken, NJ (US); Jianghong Luo, Skillman, NJ (US); Luca Blessent, Whitehouse Station, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/931,970

(22) Filed: Jul. 17, 2020

(65) Prior Publication Data
US 2021/0029025 A1    Jan. 28, 2021

Related U.S. Application Data

(60) Provisional application No. 62/878,963, filed on Jul. 26, 2019.

(51) Int. Cl.
*H04L 12/725* (2013.01)
*H04W 40/02* (2009.01)
(Continued)

(52) U.S. Cl.
CPC .......... *H04L 45/302* (2013.01); *H04W 40/02* (2013.01); *H04W 84/045* (2013.01)

(58) Field of Classification Search
CPC combination set(s) only.
See application file for complete search history.

(56) References Cited

U.S. PATENT DOCUMENTS

2018/0159649 A1*  6/2018  Sun .................... H04L 5/0092
2019/0288757 A1*  9/2019  Zhou .................. H04B 7/0617
(Continued)

OTHER PUBLICATIONS

"3rd Generation Partnership Project; Technical Specification Group Radio Access Network; Study on Integrated Access and Backhaul ; (Release 15)," 3GPP Draft, TR 38874 V070—Final—TRCH, 3rd Generation Partnership Project (3GPP), Mobile Competence Centre, 650, Route Des Lucioles, F-06921, Sophia-Antipolis Cedex, France, Nov. 8, 2018 (Nov. 8, 2018), XP051591963, pp. 1-111.
(Continued)

Primary Examiner — Xavier S Wong
(74) Attorney, Agent, or Firm — Harrity & Harrity, LLP

(57) ABSTRACT

In some aspects, a wireless node in a wireless multi-hop network may receive, from a central unit in the wireless multi-hop network, a configuration indicating that a first wireless interface between the wireless node and a first parent node of the wireless node is to be used for a first traffic type, and that a second wireless interface between the wireless node and a second parent node of the wireless node is to be used for a second traffic type; configure a first connection with the first parent node via the first wireless interface and a second connection with the second parent node via the second wireless interface based at least in part on the configuration; and transmit or receive a communication using the first connection or the second connection based at least in part on a traffic type of the communication.

30 Claims, 10 Drawing Sheets

(51) Int. Cl.
*H04L 45/302* (2022.01)
*H04W 84/04* (2009.01)

(56) References Cited

U.S. PATENT DOCUMENTS

2020/0015295 A1\* 1/2020 Stauffer ................ H04W 48/08
2020/0374763 A1\* 11/2020 Novlan ................ H04W 40/36

OTHER PUBLICATIONS

International Search Report and Written Opinion—PCT/US2020/042750—ISA/EPO—dated Oct. 30, 2020.
Makris N., et al., "Cloud-Based Convergence of Heterogeneous RANs in 5G Disaggregated Architectures", 2018 IEEE International Conference on Communications (ICC), IEEE, May 20, 2018 (May 20, 2018), 7 pages, XP033378213, DOI: 10.1109/ICC.2018.8422227 [retrieved on Jul. 27, 2018] the whole document.
Redana S., et al., "5G PPP Architecture Working Group—View on 5G Architecture, Version 3.0", Jun. 19, 2019 (Jun. 19, 2019), pp. 1-166, XP055736939, DOI: 10.5281/zenodo.3265031, Retrieved from the Internet : URL: https://5g-ppp.eu/wp-content/uploads/2019/07/5G-PPP-5G-Architecture-White-Paper_v3.0_PublicConsultation.pdf [retrieved on Oct. 6, 2020] paragraph [3 .1. 1]—paragraph [03.3].

\* cited by examiner

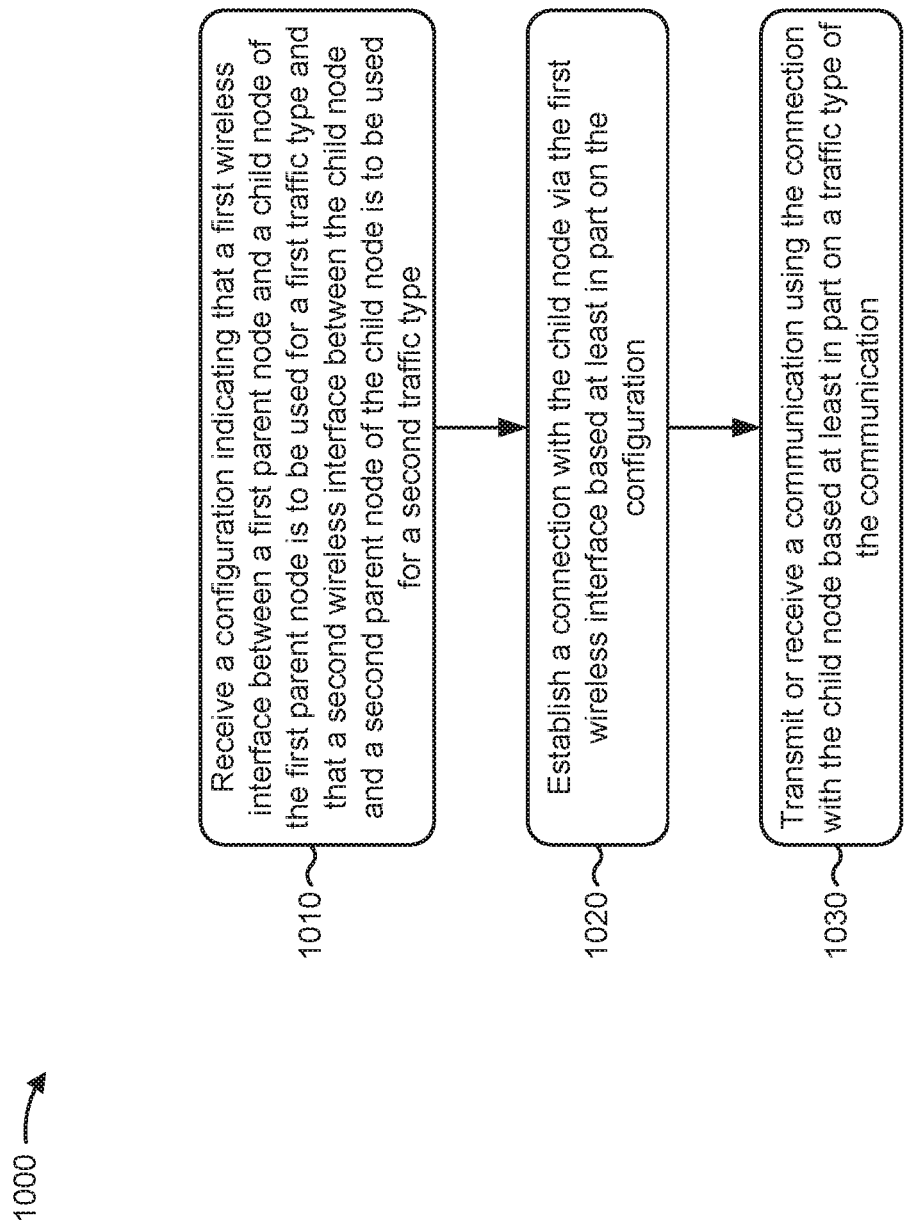

SEPARATION OF A CONTROL PLANE AND A USER PLANE FOR AN INTEGRATED ACCESS AND BACKHAUL NETWORK

CROSS-REFERENCE TO RELATED APPLICATION

This patent application claims priority to U.S. Provisional Patent Application No. 62/878,963, filed on Jul. 26, 2019, entitled "SEPARATION OF A CONTROL PLANE AND A USER PLANE FOR AN INTEGRATED ACCESS AND BACKHAUL NETWORK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for separation of a control plane and a user plane for an integrated access and backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless node in a wireless multi-hop network, may include receiving, from a central unit in the wireless multi-hop network, a configuration indicating that a first wireless interface between the wireless node and a first parent node of the wireless node is to be used for a first traffic type and that a second wireless interface between the wireless node and a second parent node of the wireless node is to be used for a second traffic type; configuring a first connection with the first parent node via the first wireless interface and a second connection with the second parent node via the second wireless interface based at least in part on the configuration; and transmitting or receiving a communication using the first connection or the second connection based at least in part on a traffic type of the communication.

In some aspects, a method of wireless communication, performed by a central unit in a wireless multi-hop network, may include configuring a topology for the wireless multi-hop network that includes a first wireless interface between a wireless node and a first parent node of the wireless node for a first traffic type and a second wireless interface between the wireless node and a second parent node of the wireless node for a second traffic type; and transmitting, to the wireless node, a configuration indicating that the first wireless interface is to be used for the first traffic type and that the second wireless interface is to be used for the second traffic type.

In some aspects, a method of wireless communication, performed by a first parent node in a wireless multi-hop network, may include receiving, from a central unit in the wireless multi-hop network, a configuration indicating that a first wireless interface between the first parent node and a child node of the first parent node is to be used for a first traffic type and that a second wireless interface between the child node and a second parent node of the child node is to be used for a second traffic type; configuring a connection with the child node via the first wireless interface based at least in part on the configuration; and transmitting or receiving a communication using the connection with the child node based at least in part on a traffic type of the communication.

In some aspects, a wireless node in a wireless multi-hop network for wireless communication may include memory and one or more processors operatively coupled to the memory. The memory and the one or more processors may be configured to receive, from a central unit in the wireless multi-hop network, a configuration indicating that a first wireless interface between the wireless node and a first parent node of the wireless node is to be used for a first traffic type and that a second wireless interface between the wireless node and a second parent node of the wireless node is to be used for a second traffic type; configure a first connection with the first parent node via the first wireless interface and a second connection with the second parent node via the second wireless interface based at least in part on the configuration; and transmit or receive a communication using the first connection or the second connection based at least in part on a traffic type of the communication.

In some aspects, a central unit in a wireless multi-hop network for wireless communication may include memory and one or more processors operatively coupled to the memory. The memory and the one or more processors may be configured to configure a topology for the wireless multi-hop network that includes a first wireless interface between a wireless node and a first parent node of the wireless node for a first traffic type and a second wireless interface between the wireless node and a second parent node of the wireless node for a second traffic type; and transmit, to the wireless node, a configuration indicating that the first wireless interface is to be used for the first traffic type and that the second wireless interface is to be used for the second traffic type.

In some aspects, a first parent node in a wireless multi-hop network for wireless communication may include memory and one or more processors operatively coupled to the memory. The memory and the one or more processors may be configured to receive, from a central unit in the wireless multi-hop network, a configuration indicating that a first wireless interface between the first parent node and a child node of the first parent node is to be used for a first traffic type and that a second wireless interface between the child node and a second parent node of the child node is to be used for a second traffic type; configure a connection with the child node via the first wireless interface based at least in part on the configuration; and transmit or receive a communication using the connection with the child node based at least in part on a traffic type of the communication.

In some aspects, a non-transitory computer-readable medium may store one or more instructions for wireless communication. The one or more instructions, when executed by one or more processors of a wireless node in a wireless multi-hop network, may cause the one or more processors to: receive, from a central unit in the wireless multi-hop network, a configuration indicating that a first wireless interface between the wireless node and a first parent node of the wireless node is to be used for a first traffic type and that a second wireless interface between the wireless node and a second parent node of the wireless node is to be used for a second traffic type; configure a first connection with the first parent node via the first wireless interface and a second connection with the second parent node via the second wireless interface based at least in part on the configuration; and transmit or receive a communication using the first connection or the second connection based at least in part on a traffic type of the communication.

In some aspects, a non-transitory computer-readable medium may store one or more instructions for wireless communication. The one or more instructions, when executed by one or more processors of a central unit in a wireless multi-hop network, may cause the one or more processors to: configure a topology for the wireless multi-hop network that includes a first wireless interface between a wireless node and a first parent node of the wireless node for a first traffic type and a second wireless interface between the wireless node and a second parent node of the wireless node for a second traffic type; and transmit, to the wireless node, a configuration indicating that the first wireless interface is to be used for the first traffic type and that the second wireless interface is to be used for the second traffic type.

In some aspects, a non-transitory computer-readable medium may store one or more instructions for wireless communication. The one or more instructions, when executed by one or more processors of a first parent node in a wireless multi-hop network, may cause the one or more processors to: receive, from a central unit in the wireless multi-hop network, a configuration indicating that a first wireless interface between the first parent node and a child node of the first parent node is to be used for a first traffic type and that a second wireless interface between the child node and a second parent node of the child node is to be used for a second traffic type; configure a connection with the child node via the first wireless interface based at least in part on the configuration; and transmit or receive a communication using the connection with the child node based at least in part on a traffic type of the communication.

In some aspects, a wireless node in a wireless multi-hop network for wireless communication may include means for receiving, from a central unit in the wireless multi-hop network, a configuration indicating that a first wireless interface between the wireless node and a first parent node of the wireless node is to be used for a first traffic type and that a second wireless interface between the wireless node and a second parent node of the wireless node is to be used for a second traffic type; means for configuring a first connection with the first parent node via the first wireless interface and a second connection with the second parent node via the second wireless interface based at least in part on the configuration; and means for transmitting or receiving a communication using the first connection or the second connection based at least in part on a traffic type of the communication.

In some aspects, a central unit in a wireless multi-hop network for wireless communication may include means for configuring a topology for the wireless multi-hop network that includes a first wireless interface between a wireless node and a first parent node of the wireless node for a first traffic type and a second wireless interface between the wireless node and a second parent node of the wireless node for a second traffic type; and means for transmitting, to the wireless node, a configuration indicating that the first wireless interface is to be used for the first traffic type and that the second wireless interface is to be used for the second traffic type.

In some aspects, a first parent node in a wireless multi-hop network for wireless communication may include means for receiving, from a central unit in the wireless multi-hop network, a configuration indicating that a first wireless interface between the first parent node and a child node of the first parent node is to be used for a first traffic type and that a second wireless interface between the child node and a second parent node of the child node is to be used for a second traffic type; means for configuring a connection with the child node via the first wireless interface based at least in part on the configuration; and means for transmitting or receiving a communication using the connection with the child node based at least in part on a traffic type of the communication.

Aspects generally include a method, device, apparatus, computer program product, non-transitory computer-readable medium, user equipment, base station, wireless communication device, wireless node, central unit, integrated access and backhaul (IAB) node, parent node, child node, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-10 are diagrams illustrating example processes relating to separation of a control plane and a user plane for an IAB network, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
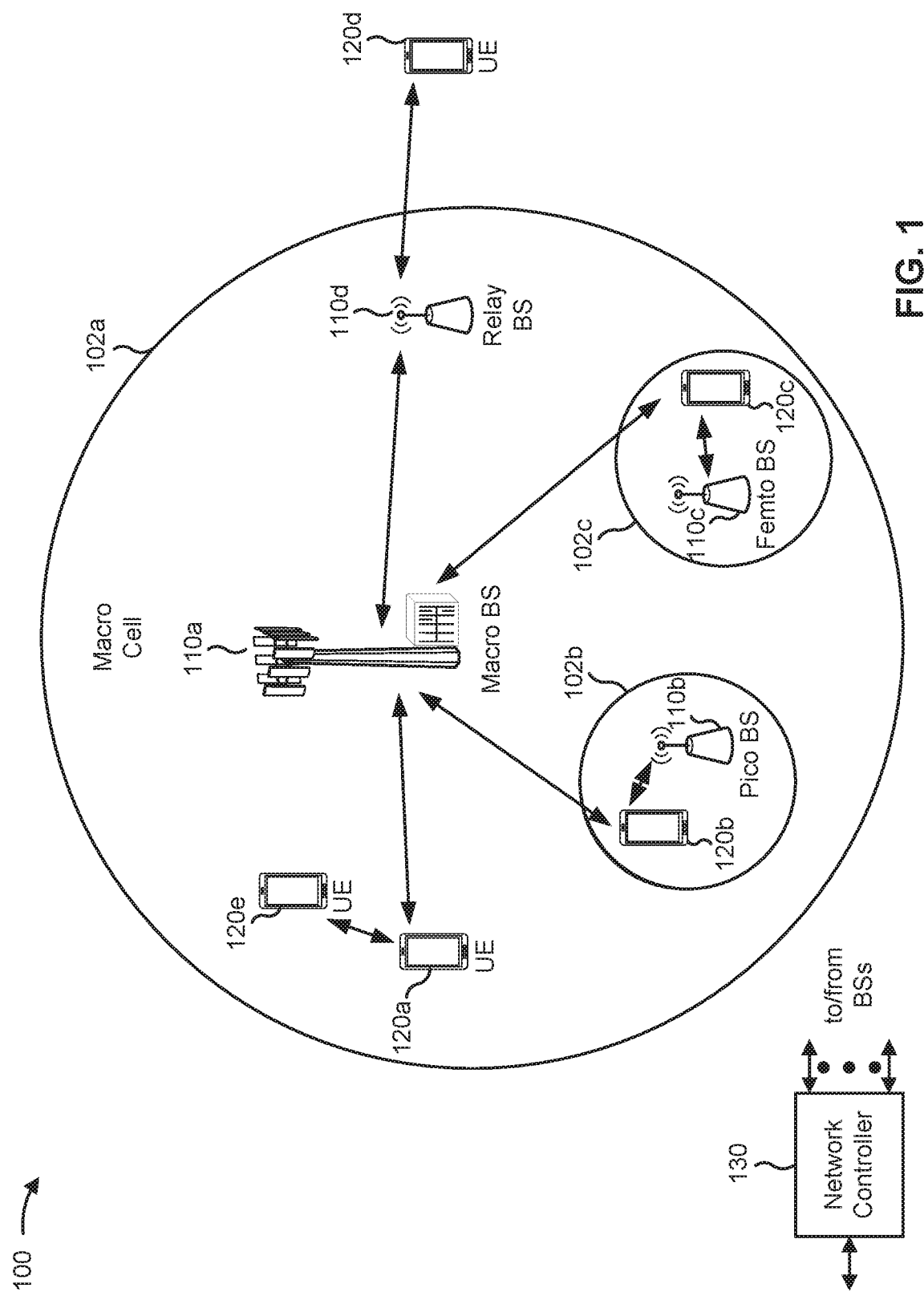
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from about 410 MHz to about 7.125 GHz, and/or may communicate using an operating band having a second frequency range (FR2), which may span from about 24.25 GHz to about 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
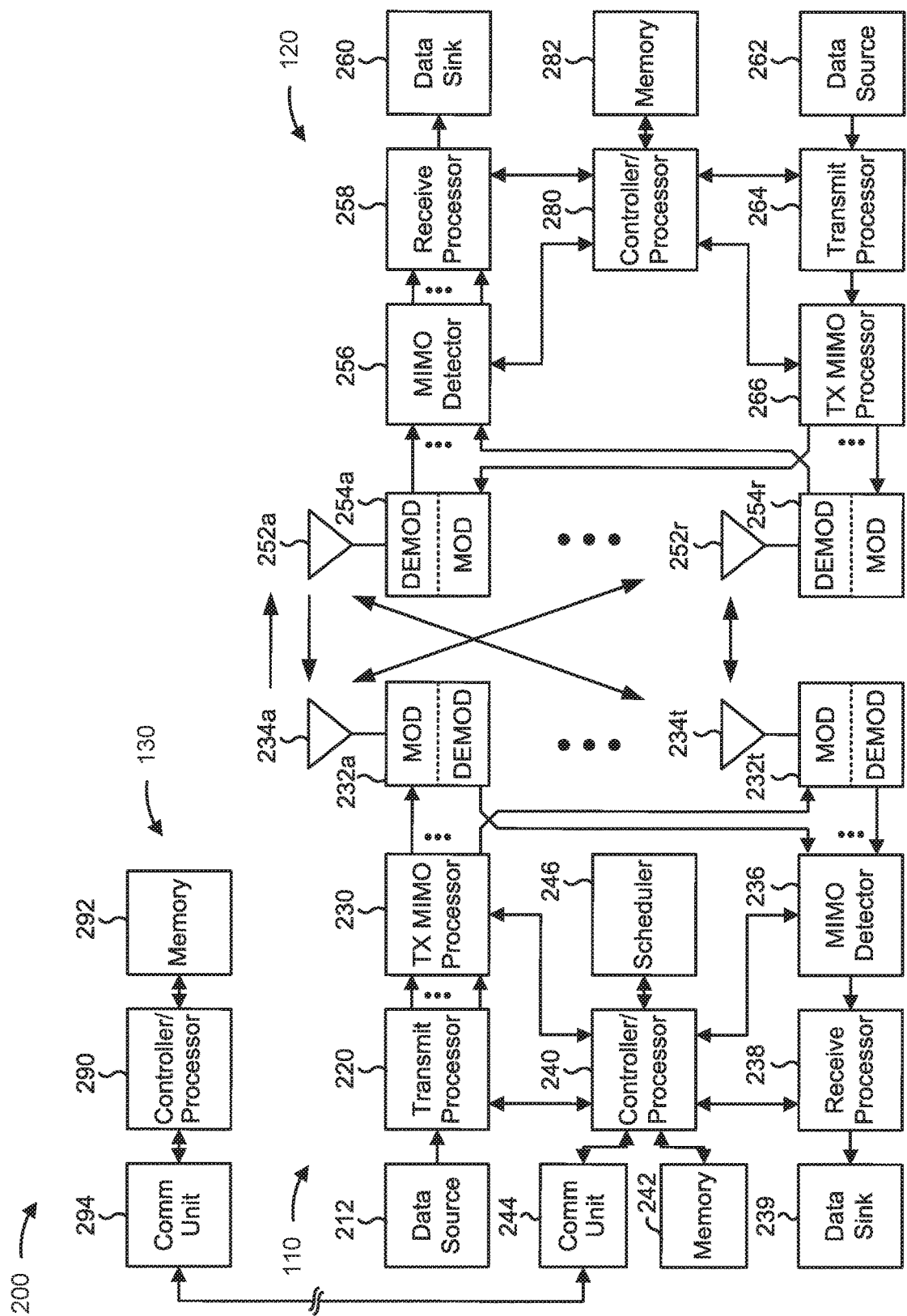
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with separation of a control plane and a user plane for an integrated access and backhaul (IAB) network, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, process 1000 of FIG. 10, and/or other processes as described herein. A scheduler 246 may schedule UEs for data transmission on the downlink and/or uplink.

In some aspects, the components described in connection with network controller 130 and/or base station 110 may be included in a central unit (CU) of an IAB donor, the components described in connection with base station 110 may be included in a distributed unit (DU) of an IAB donor and/or an IAB node, and/or the components described in connection with UE 120 may be included in a mobile termination (MT) of an IAB node.

In some aspects, a wireless node (e.g., an IAB node, a UE 120, and/or the like) in a wireless multi-hop network may include means for receiving, from a central unit in the wireless multi-hop network, a configuration indicating that a first wireless interface between the wireless node and a first parent node of the wireless node is to be used for a first traffic type, and that a second wireless interface between the wireless node and a second parent node of the wireless node is to be used for a second traffic type; means for configuring a first connection with the first parent node via the first wireless interface and a second connection with the second parent node via the second wireless interface based at least in part on the configuration; means for transmitting or receiving a communication using the first connection or the second connection based at least in part on a traffic type of the communication; and/or the like. In some aspects, such means may include one or more components of UE 120 (which may correspond to an MT of an IAB node) described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a central unit (e.g., of an IAB donor) in a wireless multi-hop network may include means for configuring a topology for the wireless multi-hop network that includes a first wireless interface between a wireless node and a first parent node of the wireless node for a first traffic type, and a second wireless interface between the wireless node and a second parent node of the wireless node for a second traffic type; means for transmitting, to the wireless node, a configuration indicating that the first wireless interface is to be used for the first traffic type and that the second wireless interface is to be used for the second traffic type; and/or the like. In some aspects, such means may include one or more components of base station 110 and/or network controller 130 (one or both of which may correspond to the CU) described in connection with FIG. 2, such as antenna 234, DEMOD 232, MIMO detector 236, receive processor 238, controller/processor 240, transmit processor 220, TX MIMO processor 230, MOD 232, antenna 234, controller/processor 290, memory 292, communication unit 294, and/or the like.

In some aspects, a first parent node (e.g., an IAB node) in a wireless multi-hop network may include means for receiving, from a central unit in the wireless multi-hop network, a configuration indicating that a first wireless interface between the first parent node and a child node of the first parent node is to be used for a first traffic type, and that a second wireless interface between the child node and a second parent node of the child node is to be used for a second traffic type; means for configuring a connection with the child node via the first wireless interface based at least in part on the configuration; means for transmitting or receiving a communication using the connection with the child node based at least in part on a traffic type of the communication; and/or the like. In some aspects, such means may include one or more components of base station 110 (which may correspond to a DU of the IAB node) described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
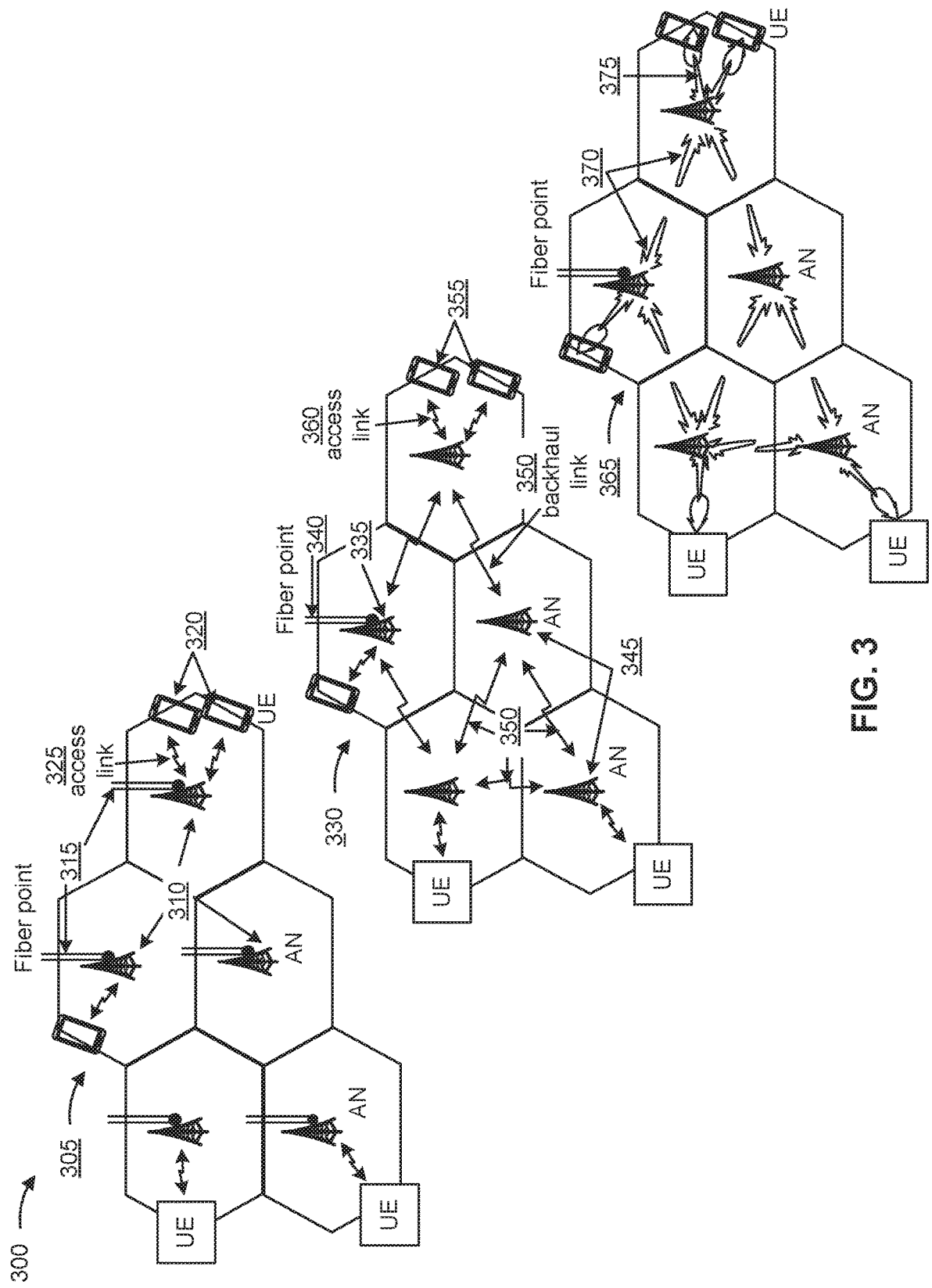
FIG. 3 is a diagram illustrating examples 300 of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. An IAB network is a type of wireless multi-hop network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations, IAB nodes (or IAB-nodes), and/or the like. The non-anchor base station 345 may communicate directly with or indirectly with (e.g., via one or more non-anchor base stations 345) the anchor base station 335 via one or more backhaul links 350 to form a backhaul path (or route) to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what was described with regard to FIG. 3.

Figure 4:
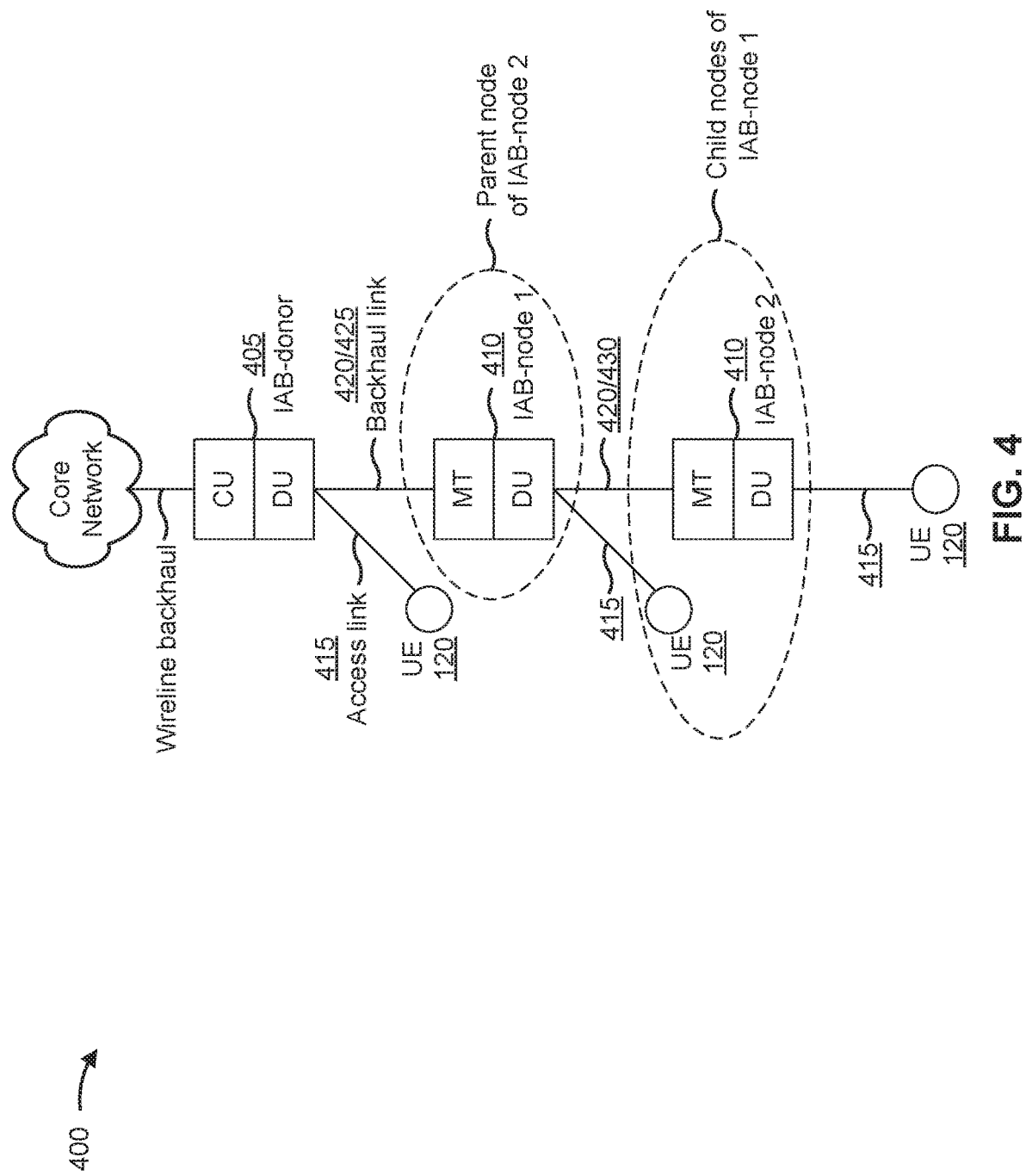
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message and/or the like). In some aspects, control and/or configuration message may be carried via an F1 application protocol (F1-AP) interface.

As further shown in FIG. 4, the IAB network may include IAB nodes 410 (shown as IAB-node 1 and IAB-node 2) that connect to the core network via the IAB donor 405. As shown, an IAB node 410 may include mobile termination (MT) functions (sometimes referred to as UE functions (UEF)), and may include DU functions (sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, a node or a wireless node may refer to an IAB donor 405 or an IAB node 410.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

In some cases, all child links 430 of an IAB node 410 may be scheduled by a DU of the IAB node 410, and techniques such as a time-division duplexing (TDD) slot configuration may be used to address the half duplex constraint, where each time resource is indicated as a downlink (DL) resource, an uplink (UL) resource, or a flexible resource. In some cases, both child backhaul links 420 and child access links 415 of an IAB node 410 can be scheduled by the IAB node 410 in the same time resource but with different resource blocks (e.g., different frequency domain resources) as long as both links follow the same direction (e.g., either DL or UL as defined by a TDD slot configuration for the IAB node 410).

However, a parent backhaul link 425 of an IAB node 410 and a child link 430 of the IAB node 410 are scheduled by different DUs. The parent backhaul link is scheduled by a DU of a parent node of the IAB node 410, while the child links are scheduled by the DU of the IAB node 410. To avoid scheduling conflicts that violate the half duplex constraint of the IAB node 410, a TDM solution can be adopted in the IAB network so that different (e.g., non-overlapping) sets of time resources are coordinated between a parent DU and a child DU for control by the respective DUs. In this case, the parent backhaul link 425 of an IAB node 410 (controlled by the parent DU) is active in a first set of time resources, while the child links 430 of the IAB node 410 (controlled by the DU of the IAB node 410), including both child access links 415 and child backhaul links 420, are active in a second set of time resources.

Other schemes such as spatial division multiplexing (SDM) and/or frequency division multiplexing (FDM) simultaneous TX or SDM and/or FDM simultaneous RX between a parent backhaul link 425 and child links 430 can be adopted in an IAB network to handle the half duplex constraint. For SDM and/or FDM simultaneous TX, both the parent backhaul link 425 and child links 430 can use the same time resource but with different directions (e.g., parent link with UL and child links with DL) so that the IAB node 410 is in a transmission mode over both links. Similarly, for SDM and/or FDM simultaneous RX, the IAB node 410 may be in a reception mode over both links.

In some cases, a CU of an IAB donor 405 may configure resource patterns for IAB nodes 410 in the IAB network. For example, a time resource may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node (e.g., by a DU of the parent node). For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node). For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available. Additional details regarding resource types in an IAB network are described below in connection with FIG. 5.

As indicated above, FIG. 4 is provided as an example. Other examples may differ from what is described with regard to FIG. 4.

Figure 5:
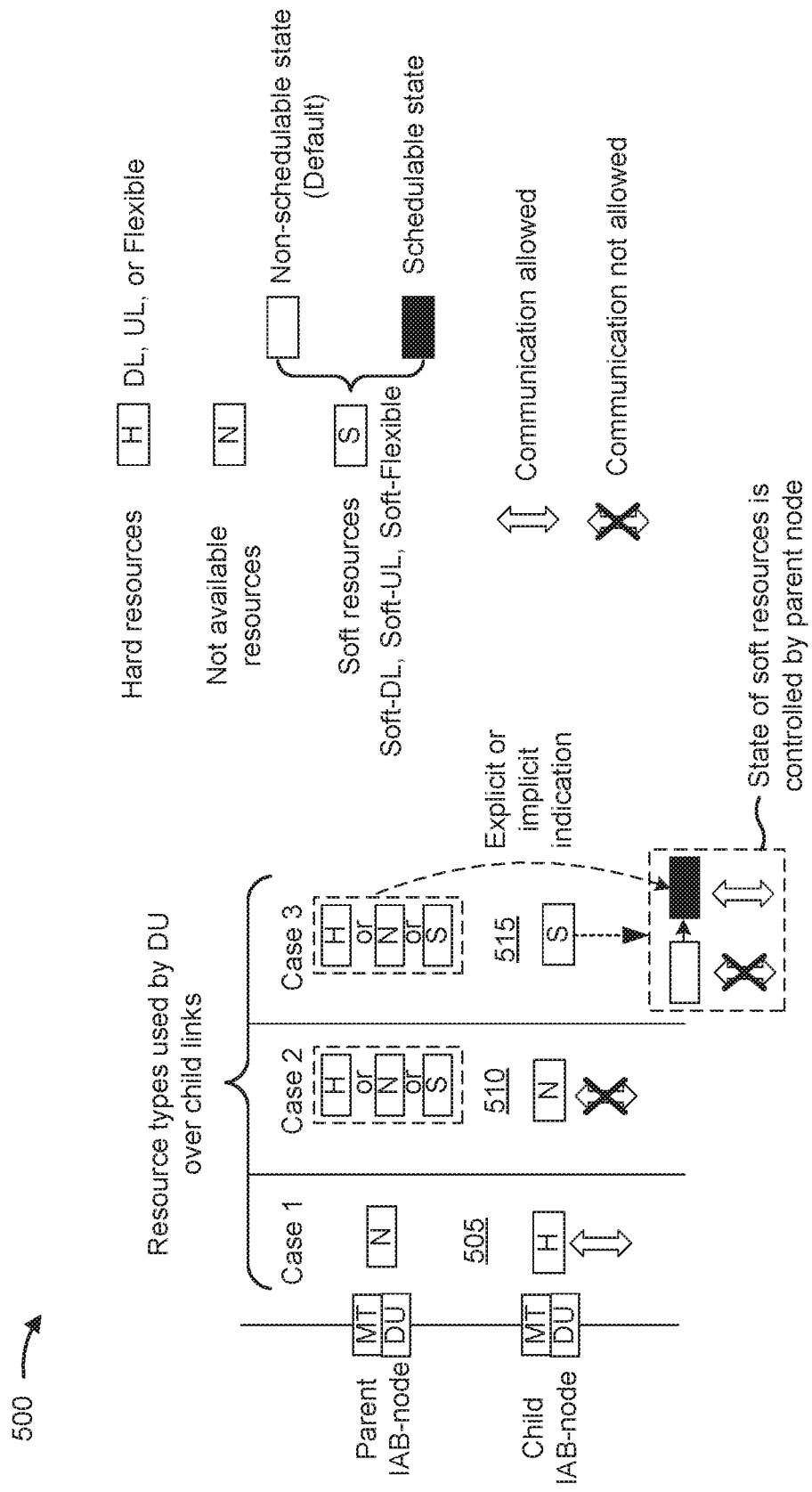
FIG. 5 is a diagram illustrating an example 500 of resource types in an IAB network, in accordance with various aspects of the disclosure.

FIG. 5 is a diagram illustrating an example 500 of resource types in an IAB network, in accordance with various aspects of the disclosure.

As described above, in an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, sounding reference signals (SRS), and/or the like.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

When resources of an IAB network are configured as indicated above, an allocation of hard resources may be configured for average traffic and channel conditions, but may be inflexible to respond to changing traffic and channel conditions. Thus, configuration of hard resources may be inefficient, and may lead to high latency when more resources are required than are configured as hard resources. On the other hand, soft resources may require signaling overhead at each relevant hop in the IAB network to configure a resource allocation for the soft resources, which reduces spectral efficiency for the IAB network. Furthermore, once a soft resource is released by a parent node, those resources cannot be reclaimed until some condition associated with the release is satisfied (e.g., expiration of a time period). This may increase latency if a communication is received at the parent node while the soft resources are released, because the parent node cannot reclaim those resources until the condition is satisfied.

Additionally, or alternatively, an IAB node 410 may be required to wait for transmission of a communication until an available downlink time resource (e.g., a hard downlink resource, an available soft downlink resource, and/or the like) is configured and/or scheduled for the IAB node 410 (e.g., according to a resource pattern configured for the IAB node 410). This may increase latency in the IAB network, especially when such waiting occurs at multiple hops (e.g., multiple IAB nodes 410). However, some scenarios may require lower latency, such as an ultra-reliable low latency communication (URLLC), indication of a failure of an IAB node 410 and/or an IAB donor 405, and/or the like. Achieving low latency in an IAB network may be difficult because traffic travels through several hops (e.g., wireless nodes), those hops are subject to the half duplex constraint (as described above), and resources for transmission of such traffic may be unavailable at a wireless node for some time after the wireless node receives the traffic.

Semi-static reconfiguration of time resources by a CU to permit low latency when such a scenario occurs may be too slow to be effective, and URLLC traffic is often bursty, which may result in inefficient allocation of hard resources and/or semi-statically configured resources. Dynamic coordination by a DU is faster than semi-static reconfiguration, but is subject to the limitations of a resource pattern configured for the DU and is also limited by the periodicity of a control channel (e.g., a physical downlink control channel (PDCCH)) used for such coordination. This could be overcome by configuring multiple control channel occasions within a slot, but that would increase overhead. Some techniques and apparatuses described herein permit low latency transmission of communications in an IAB network and/or another type of multi-hop network without being subject to the limitations of semi-static reconfiguration or dynamic coordination described above.

As indicated above, FIG. 5 is provided as an example. Other examples may differ from what was described with regard to FIG. 5.

Figure 6:
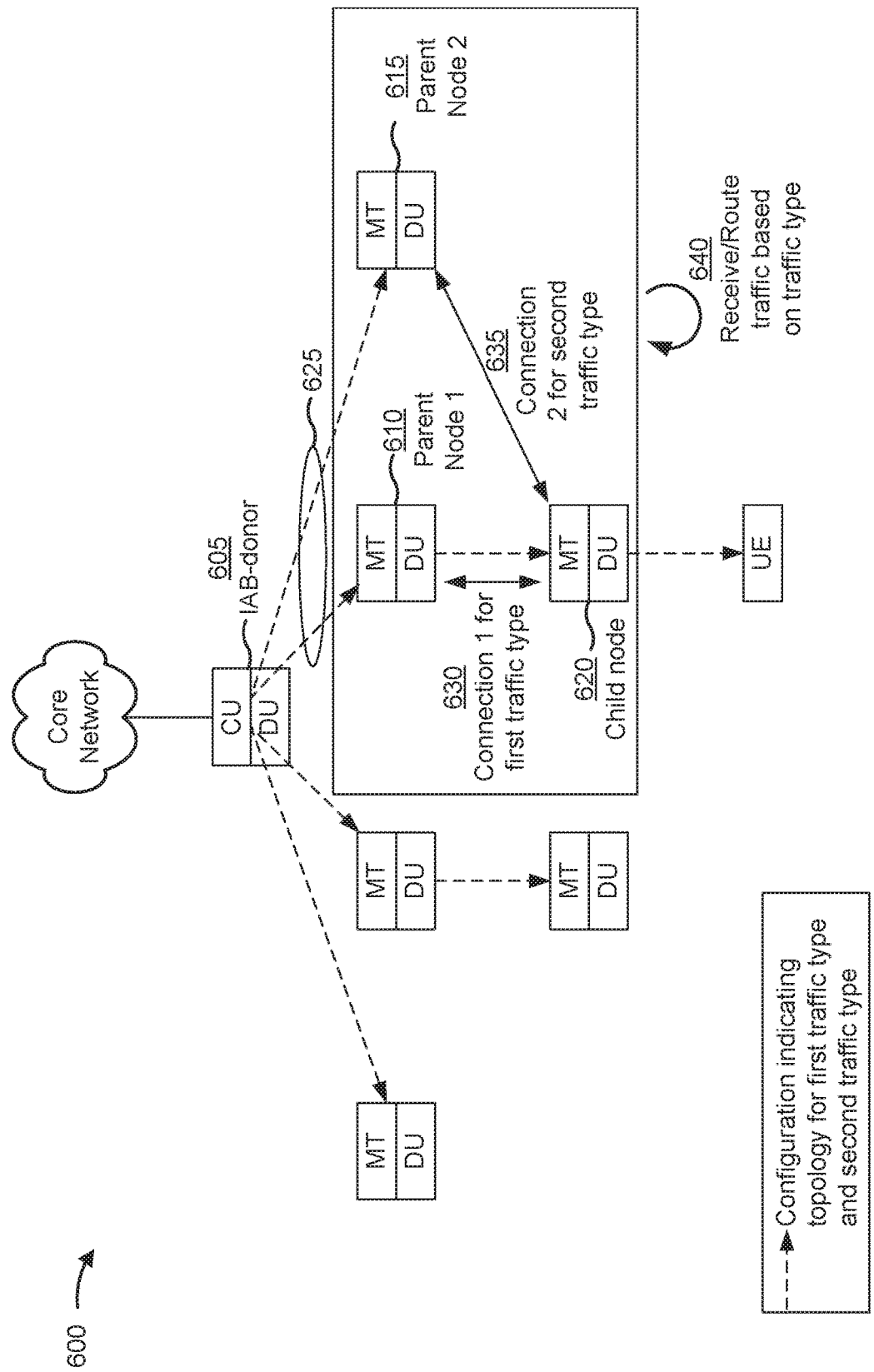
FIG. 6 is a diagram illustrating an example of separation of a control plane and a user plane for an IAB network, in accordance with various aspects of the present disclosure.

FIG. 6 is a diagram illustrating an example 600 of separation of a control plane and a user plane for an IAB network, in accordance with various aspects of the present disclosure.

As shown in FIG. 6, an IAB network may include an IAB donor 605 and multiple wireless nodes. A wireless node may include an IAB node, such as a first parent node 610 (shown as Parent Node 1), a second parent node 615 (shown as Parent Node 2), and/or a child node 620 of the first parent node 610 and the second parent node 615. Additionally, or alternatively, the wireless node may include a UE 120, as described elsewhere herein. The IAB donor 605 may include a CU and a DU, as described elsewhere herein. The IAB nodes may include an MT function and a DU function, as described elsewhere herein. For example, the IAB donor 605 may correspond to a base station 110 described in connection with FIG. 1, an anchor base station described in connection with FIG. 3, an IAB donor 405 described in connection with FIG. 4, and/or the like. Additionally, or alternatively, an IAB node may correspond to a base station 110 described in connection with FIG. 1, a non-anchor base station described in connection with FIG. 3, an IAB node 410 described in connection with FIG. 4, and/or the like. As used herein, a wireless node may refer to an IAB node and/or a UE.

As shown by reference number 625, a CU of the IAB donor 605 may transmit a configuration indicating that a first topology is to be used for a first traffic type and a second topology is to be used for a second traffic type. A topology of the IAB network may indicate one or more routes to be used to transmit traffic, one or more IAB nodes to route (e.g., relay) the traffic, one or more wireless interface types (e.g., a sub-6 gigahertz (GHz) wireless interface, a millimeter wave wireless interface, and/or the like) via which the traffic is to be transmitted or received, and/or the like. For example, the configuration may indicate that a first wireless interface between the child node 620 and the first parent node 610 is to be used for a first traffic type, and that a second wireless interface between the child node 620 and the second parent node 615 is to be used for a second traffic type.

In some aspects, the first traffic type is control traffic (e.g., control information, such as downlink control information (DCI), uplink control information (UCI), a PDCCH communication, a PUCCH communication, and/or the like). In some aspects, the second traffic type is data traffic (e.g., a data communication, such as downlink data, uplink data, a PDSCH communication, a PUSCH communication, and/or the like). Additionally, or alternatively, the two different traffic types (e.g., the first traffic type and the second traffic type) may have different quality of service (QoS) requirements. For example, the two different traffic types may be URLLC traffic (having a stricter QoS requirement) and eMBB traffic (having a less strict QoS requirement).

Additionally, or alternatively, the first traffic type may include acknowledgement (ACK) or negative acknowledgment (NACK) (collectively, ACK/NACK) feedback corresponding to a communication received via the second connection, a scheduling request (SR) to schedule a data transmission via the second connection, an IAB resource configuration for resources of the second connection, an indication of upcoming URLLC traffic via the second connection, a command to change an operating mode of the wireless node (e.g., to enter or exit a power saving mode or some other mode), a command to send a paging signal, a command to update a configuration of the wireless node (e.g., a transmit power configuration, a beam sweeping configuration, and/or the like), a command to perform a network procedure (e.g., an inter-IAB-node discovery procedure, performing one or more measurements, a beam training procedure, and/or the like), a command to send a status report (e.g., a buffer status report, a power headroom report, a power status report, a battery power status report, a mobility status report, and/or the like), and/or the like. In some aspects, the IAB resource configuration may indicate a slot format indication for the second connection (e.g., that indicates whether a slot is configured as an uplink slot, a downlink slot, or a flexible slot), a status of soft resources on the second connection (e.g., a release command that indicates whether soft resources are released by a parent node, a reclaim command that indicates whether soft resources are reclaimed by a parent node, and/or the like), a resource format for a DU (e.g., hard, soft, not available, uplink, downlink, flexible, and/or the like), and/or the like. Additionally, or alternatively, the first traffic type may include DCI, UCI, an RRC message (e.g., an RRC configuration message, an RRC reconfiguration message, and/or the like), a medium access control (MAC) control element (CE) (MAC-CE), and/or the like.

In some aspects, the configuration may indicate the first wireless interface type and the second wireless interface type. A wireless interface type may indicate, for example, a frequency range for a wireless interface. In some aspects, the first wireless interface and the second wireless interface may be in different frequency ranges (FRs). Additionally, or alternatively, the first wireless interface may be a sub-6 gigahertz wireless interface (e.g., in FR1), and the second wireless interface may be a millimeter wave interface (e.g., in FR2). Additionally, or alternatively, the wireless interface type may indicate a radio access technology (RAT) for a wireless interface. For example, a wireless interface may be an LTE interface, an NB-IoT interface, an MTC interface, a sub-6 GHz interface, a millimeter wave interface, and/or the like.

In some aspects, the configuration may be transmitted directly (e.g., via a single hop) by the IAB donor 605 to nodes in the IAB network (e.g., parent node 610, parent node 615, child node 620, and/or the like). For example, the IAB donor 605 may transmit the configuration directly to the child node 620. Additionally, or alternatively, the configuration may be transmitted indirectly (e.g., via multiple hops) by the IAB donor 605 to nodes in the IAB network. For example, the IAB donor 605 may transmit the configuration indirectly to the child node 620 via one or more parent nodes of the child node 620 (e.g., parent node 610, parent node 615, and/or the like). In some aspects, the configuration may be transmitted in an RRC message. Additionally, or alternatively, the configuration may be transmitted via an F1-AP interface.

In some aspects, the IAB donor 605 may determine the configuration (e.g., may configure a topology for the IAB network) based at least in part on a number of wireless nodes included in the IAB network, historical and/or predicted traffic volume and/or channel conditions of the IAB network, geographic locations of the wireless nodes in the IAB network, capabilities of the wireless nodes in the IAB network, and/or the like.

As shown by reference number 630, a first connection may be established and/or configured between the child node 620 and the first parent node 610 for the first traffic type based at least in part on the configuration transmitted by the IAB donor 605 (e.g., the CU). For example, the first parent node 610 and/or the child node 620 may receive the configuration, and may configure a first connection between one another for carrying traffic of the first traffic type. Configuring the first connection may include establishing the first connection, establishing and/or configuring a bearer (e.g., a radio bearer) for the first connection (e.g., based at least in part on one or more QoS parameters associated with the first traffic type), reconfiguring an existing connection, and/or the like. In some aspects, the first parent node 610 and/or the child node 620 may configure the first connection to use a first wireless interface (e.g., indicated in the configuration).

As shown by reference number 635, a second connection may be established and/or configured between the child node 620 and the second parent node 615 for the second traffic type based at least in part on the configuration transmitted by the IAB donor 605 (e.g., the CU). For example, the second parent node 615 and/or the child node 620 may receive the configuration, and may configure a second connection between one another for carrying traffic of the second traffic type. Configuring the second connection may include establishing the second connection, establishing and/or configuring a bearer for the second connection (e.g., based at least in part on one or more QoS parameters associated with the second traffic type), reconfiguring an existing connection, and/or the like. In some aspects, the second parent node 615 and/or the child node 620 may configure the second connection to use a second wireless interface (e.g., indicated in the configuration), which may be different from the first wireless interface configured for the first connection. In some aspects, the child node 620 may operate in a dual connectivity mode to permit the first connection with the first parent node 610 and the second connection with the second parent node 615.

As shown by reference number 640, one or more of the configured wireless nodes (e.g., the child node 620, the first parent node 610, the second parent node 615, and/or the like) may communicate using a connection that is determined based at least in part on a traffic type. Such communicating may include monitoring for traffic of the traffic type, receiving traffic of the traffic type, routing traffic of the traffic type, transmitting traffic of the traffic type, relaying traffic of the traffic type, and/or the like. For example, if the first traffic type includes control information, then the first parent node 610 may transmit control information to the child node 620 via the first connection (e.g., via a first wireless interface, such as a sub-6 GHz interface), and the child node 620 may monitor for and/or receive the control information via the first connection. Similarly, if the second traffic type includes a data communication (e.g., scheduled by the control information), then the second parent node 615 may transmit the data communication to the child node 620 via the second connection (e.g., via a second wireless interface, such as a millimeter wave interface), and the child node 620 may monitor for and/or receive the data communication via the second connection.

In this way, different types of traffic may be transmitted using different topologies (e.g., different connections between wireless nodes, different routes through the IAB network, different wireless interfaces, different RATs, and/or the like) to assist with satisfying different levels of QoS requirements associated with the different traffic types. For example, a first type of traffic (e.g., control information) can be transmitted via the first connection and the first wireless interface (e.g., a sub-6 GHz interface) with a higher reliability and lower latency, while a second type of traffic (e.g., data scheduled by the control information) can be transmitted with increased spectral efficiency, such as by using a millimeter wave interface that provides spatial diversity.

In FIG. 6, the first connection is shown as a connection between the child node 620 and a parent node that is not the IAB donor 605. This connection provides a multi-hop route between the child node 620 and the IAB donor 605 (e.g., a first hop between the child node 620 and the first parent node 610 and a second hop between the first parent node 610 and the IAB donor 605). In some aspects, the first connection may be directly between the child node 620 and the IAB donor 605 (e.g., the IAB donor 605 may be a parent node of the child node 620), as described below in connection with FIG. 7. In this case, the first connection provides a single-hop route between the child node 620 and the IAB donor 605. Furthermore, a resource configuration for different connections and/or wireless interfaces may be more precisely configured to improve performance for transmission of different traffic on those connections and/or wireless interfaces.

Although the first parent node 610 and the second parent node 615 are shown as separate parent nodes, in some aspects, the first parent node 610 and the second parent node 615 may be the same parent node (e.g., a single parent node). For example, the first connection (e.g., using a first wireless interface) may be established and/or configured between the child node 620 and a parent node for the first traffic type, and a second connection (e.g., using a second wireless interface) may be established and/or configured between the child node 620 and the parent node for the second traffic type, in a similar manner as described above.

As indicated above, FIG. 6 is provided as an example. Other examples may differ from what was described with regard to FIG. 6.

Figure 7:
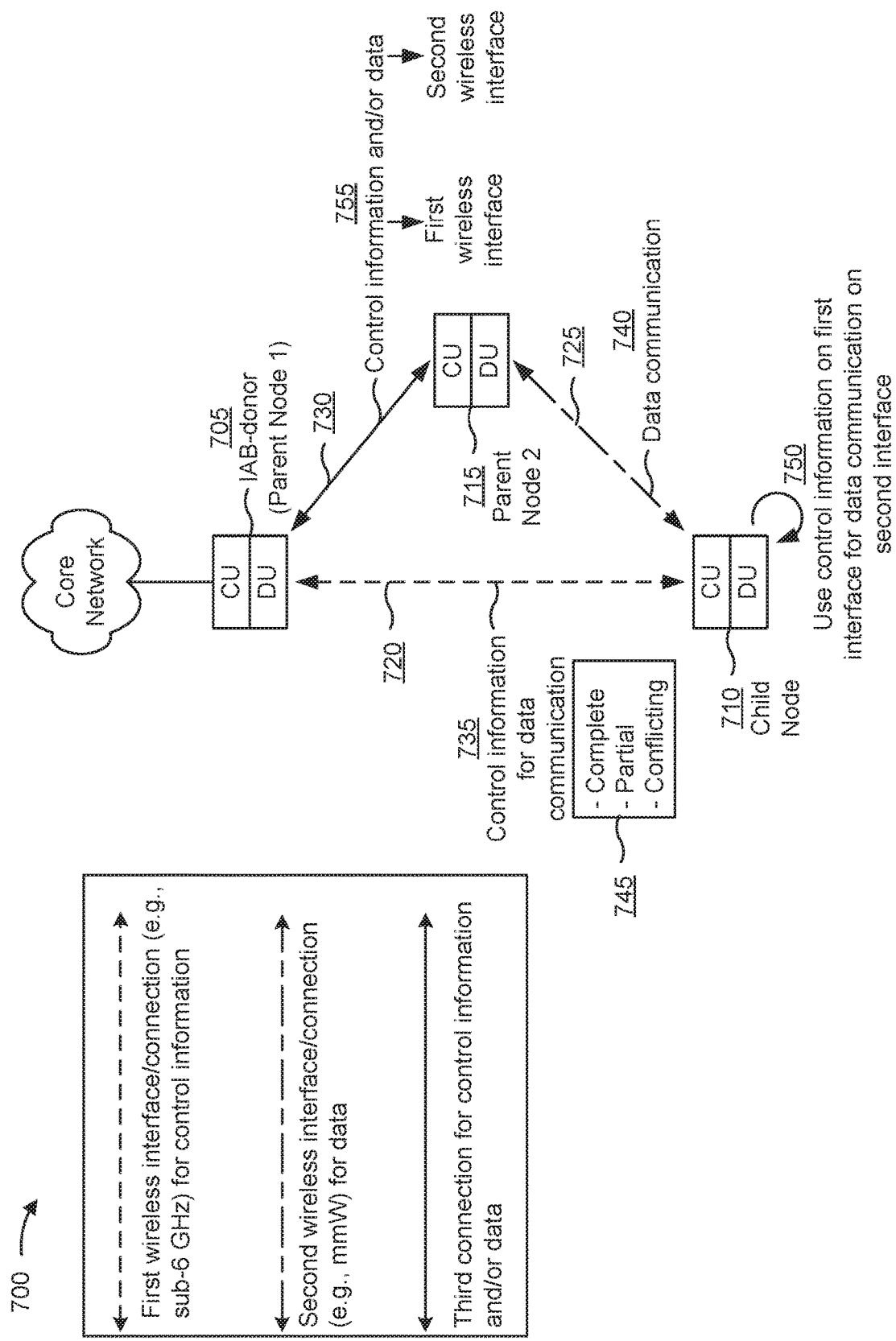
FIG. 7 is a diagram illustrating another example of separation of a control plane and a user plane for an IAB network, in accordance with various aspects of the present disclosure.

FIG. 7 is a diagram illustrating another example 700 of separation of a control plane and a user plane for an IAB network, in accordance with various aspects of the present disclosure.

As shown in FIG. 7, an IAB network may include an IAB donor 705 and multiple wireless nodes. As shown, the IAB donor 705 may be a first parent node (shown as Parent Node 1) of a child node 710. As further shown, the IAB network may include a second parent node 715 (shown as Parent Node 2) of the child node 710. Although the IAB donor 705 is described as the first parent node in example 700, the terms first parent node and second parent node may generally be used to indicate different parent nodes that communicate with the child node 710.

As described above, a wireless node may include an IAB node (e.g., a parent node and/or a child node), a UE (e.g., a UE 120), and/or the like. The IAB donor 705 may include a CU and a DU, as described elsewhere herein. The IAB nodes (e.g., the child node 710 and the second parent node 715) may include an MT function and a DU function, as described elsewhere herein. For example, the IAB donor 705 may correspond to a base station 110 described in connection with FIG. 1, an anchor base station described in connection with FIG. 3, an IAB donor 405 described in connection with FIG. 4, an IAB donor 605 described in connection with FIG. 6, and/or the like. Additionally, or alternatively, an IAB node may correspond to a base station 110 described in connection with FIG. 1, a non-anchor base station described in connection with FIG. 3, an IAB node 410 described in connection with FIG. 4, an IAB node described in connection with FIG. 6, and/or the like. As used herein, a wireless node may refer to an IAB node and/or a UE.

As described above in connection with FIG. 6, a CU of the IAB donor 705 may transmit a configuration indicating that a first topology is to be used for a first traffic type and a second topology is to be used for a second traffic type. For example, the configuration may indicate that a first wireless interface between the child node 710 and a first parent node (e.g., the IAB donor 705) is to be used for a first traffic type and that a second wireless interface between the child node 710 and a second parent node (e.g., the second parent node 715) is to be used for a second traffic type. Additional details regarding the configuration are described above in connection with FIG. 6. In example 700, the first traffic type is control traffic (e.g., control information), and the second traffic type is data traffic (e.g., one or more data communications).

As shown by reference number 720, based at least in part on the configuration, the IAB donor 705 and/or the child node 710 may configure a first connection that uses a first wireless interface for the first traffic type. In example 700, the first wireless interface is a sub-6 GHz interface (e.g., FR1). Thus, the IAB donor 705 and/or the child node 710 may configure the first connection to use a sub-6 GHz interface for control information. In example 700, the first connection provides a single-hop route between the child node 710 and the CU of the IAB donor 705. This single-hop route may provide lower latency than a multi-hop route.

As shown by reference number 725, based at least in part on the configuration, the child node 710 and/or the second parent node 715 may configure a second connection that uses a second wireless interface for the second traffic type. In example 700, the second wireless interface is a millimeter wave interface (e.g., FR2). Thus, the child node 710 and/or the second parent node 715 may configure the second connection to use a millimeter wave interface for one or more data communications. In example 700, the second connection provides a multi-hop route between the child node 710 and the CU of the IAB donor 705 (e.g., via the second parent node 715). In FIG. 7, the first connection provides a single-hop route between the child node 710 and the IAB donor 705, and the second connection provides a multi-hop route between the child node 710 and the same IAB donor 705. However, in some aspects, the second connection may provide a multi-hop route between the child node 710 and a different IAB donor other than the IAB donor 705 connected to the child node 710 via the first connection.

As shown by reference number 730, in some aspects, the configuration may indicate a third connection and/or a fourth connection between the first parent node (e.g., the IAB donor 705) and the second parent node (e.g., the second parent node 715). In some aspects, the wireless interface used for the third connection (e.g., a third wireless interface) between the first parent node and the second parent node may be the same as the wireless interface used for the first connection between the child node and the second parent node. In example 700, the third wireless interface is a sub-6 GHz interface. In some aspects, the wireless interface used for the fourth connection (e.g., a fourth wireless interface) between the first parent node and the second parent node may be the same as the wireless interface used for the second connection between the child node and the second parent node. In example 700, the fourth wireless interface is a millimeter wave interface.

As shown by reference number 735, the first parent node and the child node 710 may transmit and receive traffic of the first traffic type using the first connection. For example, the first parent node or the child node 710 may transmit the first traffic type via the first connection. In example 700, the IAB donor 705 may transmit control information via the sub-6 GHz interface. In some aspects, the control information may include DCI that schedules a data communication to be transmitted via the second connection. For example, the DCI may schedule a downlink data communication to be transmitted by the second parent node 715 to the child node 710 via the second connection using a millimeter wave interface. In this case, the DCI may include a downlink grant. As another example, the DCI may schedule an uplink data communication to be transmitted by the child node 710 to the second parent node 715 via the second connection using a millimeter wave interface. In this case, the DCI may include an uplink grant.

In some aspects, the control information may include UCI transmitted by the child node 710 to the IAB donor 705. For example, the UCI may include ACK/NACK feedback for a data communication received by the child node 710 via the second connection, a scheduling request to schedule an uplink data communication via the second connection, and/or the like. In some aspects, the IAB donor 705 may transmit, via the first connection, DCI for a data communication on the second connection based at least in part on receiving a scheduling request via the first connection.

As shown by reference number 740, the second parent node 715 and the child node 710 may transmit and receive traffic of the second traffic type using the second connection. For example, if the DCI is for a downlink data communication, then the second parent node 715 may transmit the downlink data communication according to scheduling information included in the DCI. Alternatively, if the DCI is for an uplink data communication, then the child node 710 may transmit the uplink data communication according to scheduling information included in the DCI.

Additionally, or alternatively, the DCI may include a set of control parameters for the data communication. The set of control parameters may include, for example, a time domain resource allocation for the data communication, a frequency domain resource allocation for the data communication, a modulation and coding scheme (MCS) for the data communication, a beam index to be used for the second connection to receive or transmit the data communication, a power control parameter associated with the data communication, and/or the like.

As shown by reference number 745, in some aspects, the DCI may include a complete set of control parameters used to schedule and transmit the data communication. In this case, the node transmitting the data communication scheduled by the DCI may use only the set of control parameters indicated in DCI for scheduling and transmission of the data communication. Alternatively, the DCI may include a first set of control parameters, and a second set of control parameters may be indicated in a different signaling message. In some aspects, the signaling message may include an RRC message, the configuration that indicates the topology (as described above), and/or the like. Additionally, or alternatively, the DCI transmitted via the first connection may be a first DCI, and the signaling message may include a second DCI transmitted via the second connection. In this case, a first set of control parameters for the data communication may be indicated in first DCI transmitted via the first connection, and a second set of control parameters for the data communication may be indicated in second DCI transmitted via the second connection.

In some aspects, when the child node 710 receives first control information via the first connection and second control information via the second connection, the first control information and the second control information may conflict with one another. For example, the first control information may indicate a first value to be used for a parameter (e.g., a first MCS index and/or the like), and the second control information may indicate a second value to be used for the parameter (e.g., a second MCS index and/or the like). In this case, the child node 710 may use a prioritization rule to determine which control information to use for the data communication. In some aspects, the prioritization rule may be indicated in an RRC message, the configuration that indicates the topology, a MAC-CE, and/or the like. Additionally, or alternatively, the prioritization rule may be indicated in a wireless communication standard. In some aspects, one of the parent nodes may be designated as a primary cell and the other parent node may be designated as a secondary cell. In this case, the prioritization rule may indicate that the control information on the primary cell overrides conflicting control information on the secondary cell.

As shown by reference number 750, one or more of the configured wireless nodes (e.g., the child node 710, the IAB donor 705, the second parent node 715, and/or the like) may communicate using a connection that is determined based at least in part on a traffic type. Such communicating may include monitoring for traffic of the traffic type, receiving traffic of the traffic type, routing traffic of the traffic type, transmitting traffic of the traffic type, relaying traffic of the traffic type, and/or the like, as described above. For example, if the first traffic type includes control information, then the IAB donor 705 may transmit control information to the child node 710 via the first connection (e.g., via a first wireless interface, such as a sub-6 GHz interface), and the child node 710 may monitor for and/or receive the control information via the first connection. Similarly, if the second traffic type includes a data communication (e.g., scheduled by the control information), then the second parent node 715 may transmit the data communication to the child node 710 via the second connection (e.g., via a second wireless interface, such as a millimeter wave interface), and the child node 710 may monitor for and/or receive the data communication via the second connection.

As shown by reference number 755, the first parent node and the second parent node 715 may transmit and receive traffic of the first traffic type using a third connection, and/or may transmit and receive traffic of the second traffic type using a fourth connection. For example, the IAB donor 705 and the second parent node 715 may exchange control information via a third connection (e.g., via a sub-6 GHz interface), and/or may exchange one or more data communications via a fourth connection (e.g., via a millimeter wave interface).

As an example, the IAB donor 705 may transmit control information (e.g., DCI, UCI, and/or the like) to the child node 710 and to the second parent node 715 so that a corresponding data communication can be scheduled and/or transmitted between the child node 710 and the second parent node 715 in a coordinated manner. In this case, the IAB donor 705 may instruct the second parent node 715 and the child node 710 to transmit or receive a data communication via the second connection according to the control information. In this way, the second parent node 715 may transmit a downlink data communication and the child node 710 may monitor for the downlink data communication using, for example, the same resources (e.g., time resources, frequency resources, spatial resources, and/or the like) to reduce the likelihood of a missed communication. Similarly, the child node 710 may transmit an uplink data communication and the second parent node 715 may monitor for the uplink data communication using the same resources, thereby reducing the likelihood of a missed communication.

In some aspects, the control information may be determined by the IAB donor 705, and may then be transmitted by the IAB donor 705 to both the child node 710 and the second parent node 715. In this case, the IAB donor 705 may transmit the control information as a single broadcast communication (e.g., via a sub-6 GHz interface, an omni-directional or pseudo-omnidirectional beam, and/or the like), and the single broadcast communication may be received and/or decoded by both the child node 710 and the second parent node 715.

Alternatively, the control information may be determined by the second parent node 715, and the second parent node 715 may transmit the control information to the IAB donor 705. In this case, the IAB donor 705 may transmit (e.g., may relay) the control information to the child node 710 (and not the second parent node 715) using the first connection.

In this way, control information can be transmitted via the first connection with higher reliability, lower latency, longer propagation distance, and/or the like associated with a sub-6 GHz interface, while data communications (e.g., scheduled by the control information) can be transmitted with increased spectral efficiency, such as by using a millimeter wave interface. Furthermore, by using a sub-6 GHz interface for the control information, the control information can be transmitted over a larger coverage area using a single hop, which enables lower latency and higher reliability as compared to a multi-hop transmission via a millimeter wave interface.

As indicated above, FIG. 7 is provided as an example. Other examples may differ from what was described with regard to FIG. 7.

Figure 8:
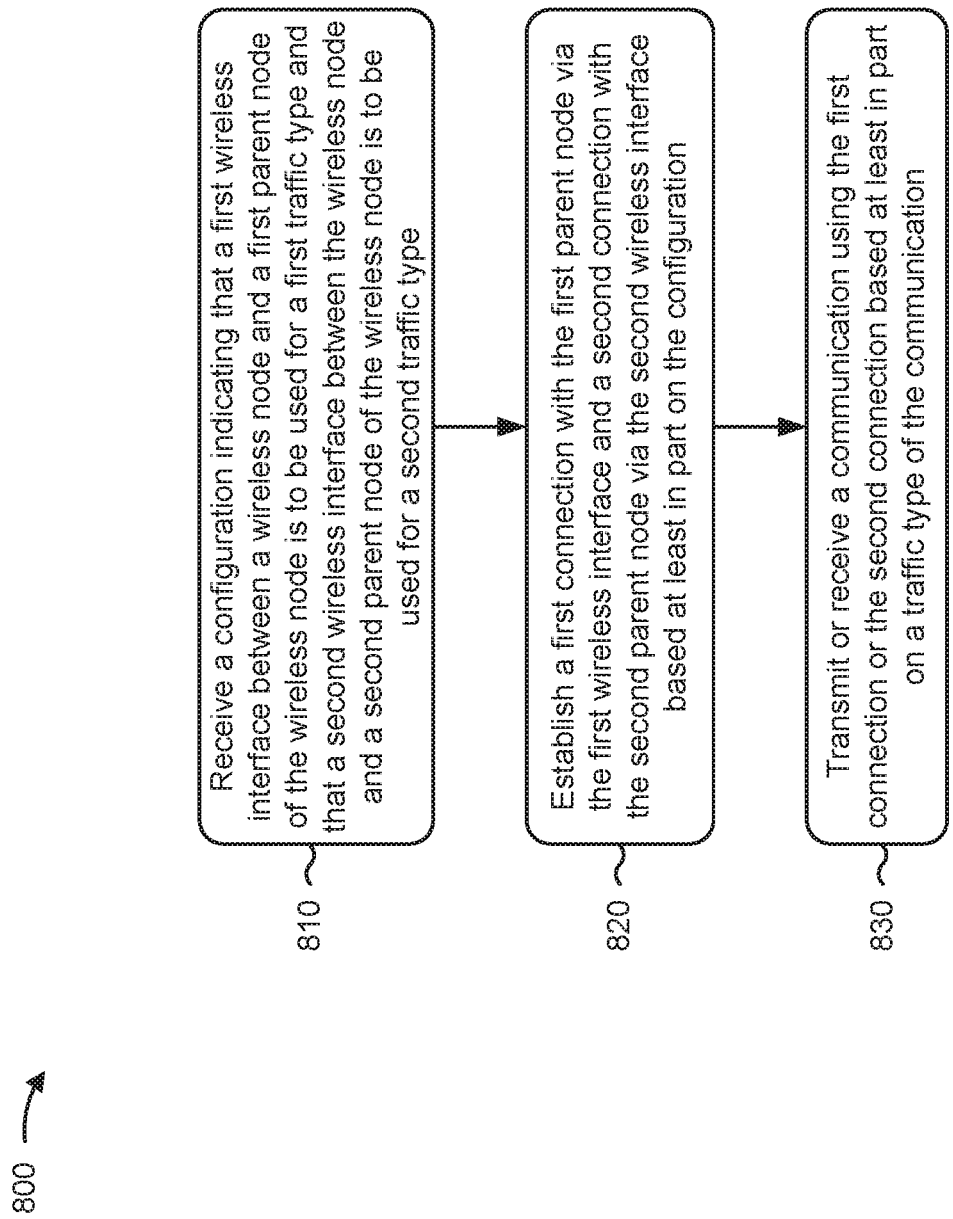

FIG. 8 is a diagram illustrating an example process 800 performed, for example, by a wireless node, in accordance with various aspects of the present disclosure. Example process 800 is an example where a wireless node (e.g., a base station 110, a UE 120, an IAB node 410, a child node 620, a child node 710, and/or the like) performs operations associated with separation of a control plane and a user plane for an IAB network.

As shown in FIG. 8, in some aspects, process 800 may include receiving, from a central unit in a wireless multi-hop network, a configuration indicating that a first wireless interface between the wireless node and a first parent node of the wireless node is to be used for a first traffic type, and that a second wireless interface between the wireless node and a second parent node of the wireless node is to be used for a second traffic type (block 810). For example, the wireless node (e.g., using receive processor 258, controller/processor 280, memory 282, and/or the like) may receive, from a central unit in the wireless multi-hop network, a configuration indicating that a first wireless interface between the wireless node and a first parent node of the wireless node is to be used for a first traffic type, and that a second wireless interface between the wireless node and a second parent node of the wireless node is to be used for a second traffic type, as described above.

As further shown in FIG. 8, in some aspects, process 800 may include configuring a first connection with the first parent node via the first wireless interface and a second connection with the second parent node via the second wireless interface based at least in part on the configuration (block 820). For example, the wireless node (e.g., using receive processor 258, transmit processor 264, controller/processor 280, memory 282, and/or the like) may configure a first connection with the first parent node via the first wireless interface and a second connection with the second parent node via the second wireless interface based at least in part on the configuration, as described above.

As further shown in FIG. 8, in some aspects, process 800 may include transmitting or receiving a communication using the first connection or the second connection based at least in part on a traffic type of the communication (block 830). For example, the wireless node (e.g., using receive processor 258, transmit processor 264, controller/processor 280, memory 282, and/or the like) may transmit or receive a communication using the first connection or the second connection based at least in part on a traffic type of the communication, as described above.

Process 800 may include additional aspects, such as any single aspect or any combination of aspects described below and/or in connection with one or more other processes described elsewhere herein.

In a first aspect, the first traffic type is control traffic and the second traffic type is data traffic.

In a second aspect, alone or in combination with the first aspect, the first traffic type has a first quality of service requirement and the second traffic type has a second quality of service requirement.

In a third aspect, alone or in combination with one or more of the first and second aspects, the first wireless interface is a sub-6 gigahertz wireless interface and the second wireless interface is a millimeter wave wireless interface.

In a fourth aspect, alone or in combination with one or more of the first through third aspects, the first wireless interface and the second wireless interface use different frequency ranges.

In a fifth aspect, alone or in combination with one or more of the first through fourth aspects, the first connection provides a single-hop route to the central unit and the second connection provides a multi-hop route to the same or a different central unit.

In a sixth aspect, alone or in combination with one or more of the first through fifth aspects, the first wireless interface is a Long Term Evolution (LTE) interface, a narrowband Internet-of-Things (NB-IoT) interface, or a sub-6 gigahertz interface.

In a seventh aspect, alone or in combination with one or more of the first through sixth aspects, process 800 includes receiving first control information via the first connection and second control information via the second connection, and the first control information conflicts with the second control information; and using either the first control information or the second control information based at least in part on a prioritization rule.

In an eighth aspect, alone or in combination with one or more of the first through seventh aspects, the first traffic type includes downlink control information (DCI) and the second traffic type includes a data communication scheduled by the DCI.

In a ninth aspect, alone or in combination with one or more of the first through eighth aspects, process 800 includes receiving the DCI via the first connection; determining a set of control parameters, for the data communication, indicated in the DCI; and receiving or transmitting the data communication via the second connection based at least in part on the set of control parameters.

In a tenth aspect, alone or in combination with one or more of the first through ninth aspects, the set of control parameters includes at least one of: a time domain resource allocation for the data communication, a frequency domain resource allocation for the data communication, a modulation and coding scheme for the data communication, a beam index to be used for the second connection to receive or transmit the data communication, a power control parameter associated with the data communication, or a combination thereof.

In an eleventh aspect, alone or in combination with one or more of the first through tenth aspects, the set of control parameters indicated in the DCI is a first set of control parameters for the data communication; and a second set of control parameters for the data communication is indicated in the configuration, received via the second connection, or a combination thereof.

In a twelfth aspect, alone or in combination with one or more of the first through eleventh aspects, the first traffic type includes at least one of: acknowledgement or negative acknowledgment feedback corresponding to a communication received via the second connection, a scheduling request to schedule a data transmission via the second connection, an IAB resource configuration for resources of the second connection, an indication of upcoming ultra-reliable low latency communication (URLLC) traffic via the second connection, a command to change an operating mode of the wireless node, a command to send a paging signal, a command to update a configuration of the wireless node, a command to perform a network procedure, a command to send a status report, or a combination thereof.

In a thirteenth aspect, alone or in combination with one or more of the first through twelfth aspects, the first parent node and the second parent node are the same parent node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
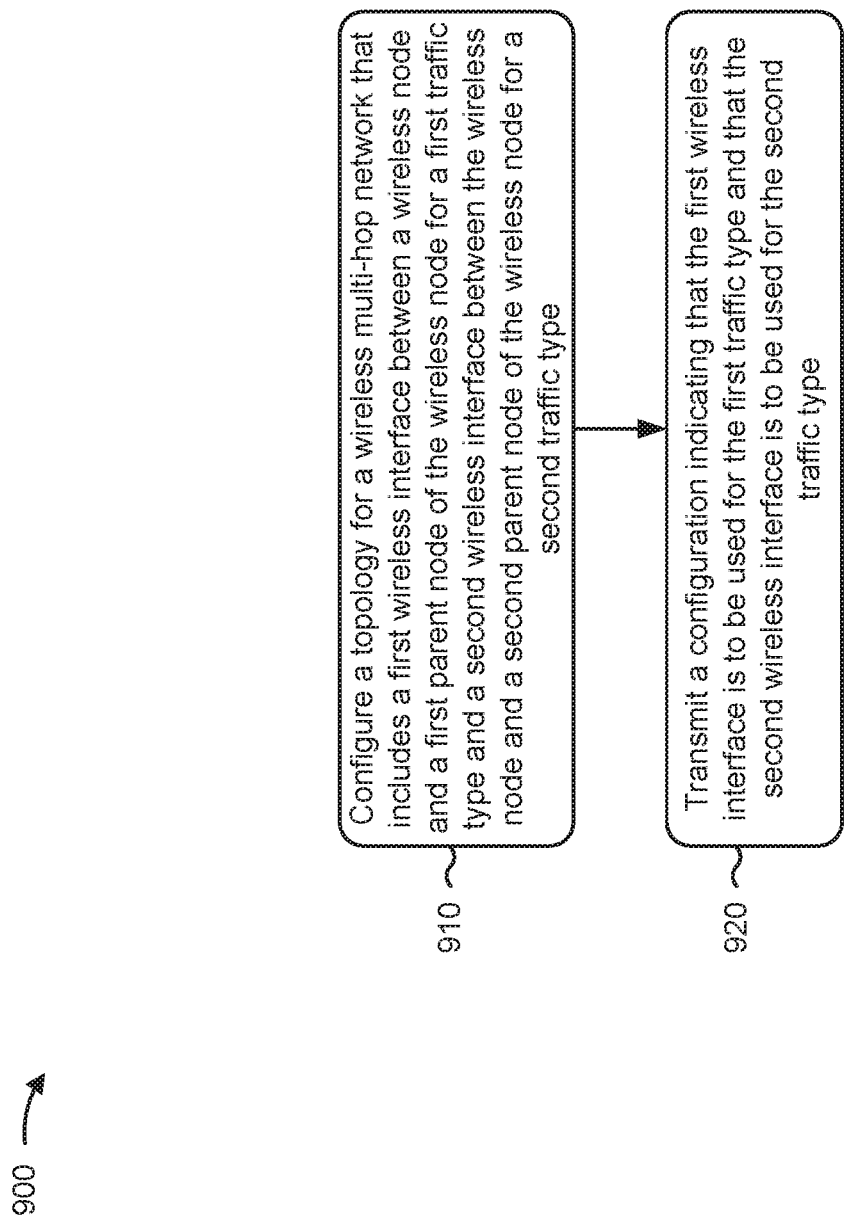

FIG. 9 is a diagram illustrating an example process 900 performed, for example, by a CU, in accordance with various aspects of the present disclosure. Example process 900 is an example where a CU (e.g., a base station 110, a CU of IAB donor 405, IAB donor 605, IAB donor 705, and/or the like) performs operations associated with separation of a control plane and a user plane for an IAB network.

As shown in FIG. 9, in some aspects, process 900 may include configuring a topology for a wireless multi-hop network that includes a first wireless interface between a wireless node and a first parent node of the wireless node for a first traffic type, and a second wireless interface between the wireless node and a second parent node of the wireless node for a second traffic type (block 910). For example, the CU (e.g., using controller/processor 240, memory 242, and/or the like) may configure a topology for the wireless multi-hop network that includes a first wireless interface between a wireless node and a first parent node of the wireless node for a first traffic type, and a second wireless interface between the wireless node and a second parent node of the wireless node for a second traffic type, as described above.

As further shown in FIG. 9, in some aspects, process 900 may include transmitting, to the wireless node, a configuration indicating that the first wireless interface is to be used for the first traffic type and that the second wireless interface is to be used for the second traffic type (block 920). For example, the CU (e.g., using transmit processor 220, using controller/processor 240, memory 242, and/or the like) may transmit, to the wireless node, a configuration indicating that the first wireless interface is to be used for the first traffic type and that the second wireless interface is to be used for the second traffic type, as described above.

Process 900 may include additional aspects, such as any single aspect or any combination of aspects described below and/or in connection with one or more other processes described elsewhere herein.

In a first aspect, the first wireless interface provides a single-hop connection between the wireless node and the central unit and the second wireless interface provides a multi-hop connection that includes: a connection between the second parent node and the same or a different central unit, and a connection between the second parent node and the wireless node.

In a second aspect, alone or in combination with the first aspect, the first traffic type is control traffic and the second traffic type is data traffic.

In a third aspect, alone or in combination with one or more of the first and second aspects, the first traffic type has a first quality of service requirement and the second traffic type has a second quality of service requirement.

In a fourth aspect, alone or in combination with one or more of the first through third aspects, the first wireless interface is a sub-6 gigahertz wireless interface and the second wireless interface is a millimeter wave wireless interface.

In a fifth aspect, alone or in combination with one or more of the first through fourth aspects, the first wireless interface and the second wireless interface use different frequency ranges.

In a sixth aspect, alone or in combination with one or more of the first through fifth aspects, the first traffic type includes downlink control information (DCI) and the second traffic type includes a data communication scheduled by the DCI.

In a seventh aspect, alone or in combination with one or more of the first through sixth aspects, the central unit is the first parent node.

In an eighth aspect, alone or in combination with one or more of the first through seventh aspects, the first parent node and the second parent node are the same parent node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a first parent node, in accordance with various aspects of the present disclosure. Example process 1000 is an example where a first parent node (e.g., a base station 110, an IAB node 410, an IAB donor 605, a parent node 610, a parent node 615, an IAB donor 705, a parent node 715, and/or the like) performs operations associated with separation of a control plane and a user plane for an IAB network.

As shown in FIG. 10, in some aspects, process 1000 may include receiving, from a central unit in a wireless multi-hop network, a configuration indicating that a first wireless interface between the first parent node and a child node of the first parent node is to be used for a first traffic type, and that a second wireless interface between the child node and a second parent node of the child node is to be used for a second traffic type (block 1010). For example, the first parent node (e.g., using receive processor 258, controller/processor 280, memory 282, and/or the like) may receive, from a central unit in the wireless multi-hop network, a configuration indicating that a first wireless interface between the first parent node and a child node of the first parent node is to be used for a first traffic type, and that a second wireless interface between the child node and a second parent node of the child node is to be used for a second traffic type, as described above.

As further shown in FIG. 10, in some aspects, process 1000 may include configuring a connection with the child node via the first wireless interface based at least in part on the configuration (block 1020). For example, the first parent node (e.g., using receive processor 258, transmit processor 264, controller/processor 280, memory 282, and/or the like)

may configure a connection with the child node via the first wireless interface based at least in part on the configuration, as described above.

As further shown in FIG. 10, in some aspects, process 1000 may include transmitting or receiving a communication using the connection with the child node based at least in part on a traffic type of the communication (block 1030). For example, the first parent node (e.g., using receive processor 258, transmit processor 264, controller/processor 280, memory 282, and/or the like) may transmit or receive a communication using the connection with the child node based at least in part on a traffic type of the communication, as described above.

Process 1000 may include additional aspects, such as any single aspect or any combination of aspects described below and/or in connection with one or more other processes described elsewhere herein.

In a first aspect, process 1000 includes configuring a connection with the second parent node based at least in part on the configuration.

In a second aspect, alone or in combination with the first aspect, the first wireless interface is a sub-6 gigahertz wireless interface and the second wireless interface is a millimeter wave wireless interface.

In a third aspect, alone or in combination with one or more of the first and second aspects, the first traffic type includes control information and the second traffic type includes a data communication scheduled by the control information.

In a fourth aspect, alone or in combination with one or more of the first through third aspects, transmitting or receiving the communication using the connection with the child node comprises transmitting or receiving the control information via the connection with the child node.

In a fifth aspect, alone or in combination with one or more of the first through fourth aspects, process 1000 includes transmitting or receiving the control information via a connection with the second parent node based at least in part on the configuration.

In a sixth aspect, alone or in combination with one or more of the first through fifth aspects, transmitting or receiving the communication using the connection with the child node comprises transmitting the control information via the connection with the child node; and process 1000 includes transmitting the control information via a connection with the second parent node to instruct the second parent node to transmit the data communication to the wireless node or to receive the data communication from the wireless node.

In a seventh aspect, alone or in combination with one or more of the first through sixth aspects, the control information transmitted to the wireless node and the second parent node is a single broadcast communication.

In an eighth aspect, alone or in combination with one or more of the first through seventh aspects, process 1000 includes receiving the control information via a connection with the second parent node; and transmitting or receiving the communication using the connection with the child node comprises transmitting the control information via the connection with the child node based at least in part on receiving the control information via the connection with the second parent node.

In a ninth aspect, alone or in combination with one or more of the first through eighth aspects, the first traffic type includes a data communication and the second traffic type includes control information that schedules the data communication.

In a tenth aspect, alone or in combination with one or more of the first through ninth aspects, transmitting or receiving the communication using the connection with the child node comprises transmitting or receiving the data communication via the connection with the child node.

In an eleventh aspect, alone or in combination with one or more of the first through tenth aspects, process 1000 includes transmitting or receiving the control information via a connection with the second parent node based at least in part on the configuration.

In a twelfth aspect, alone or in combination with one or more of the first through eleventh aspects, the first traffic type has a first quality of service requirement and the second traffic type has a second quality of service requirement.

In a thirteenth aspect, alone or in combination with one or more of the first through twelfth aspects, the first wireless interface and the second wireless interface use different frequency ranges.

In a fourteenth aspect, alone or in combination with one or more of the first through thirteenth aspects, the first wireless interface provides a single-hop route to the central unit and the second wireless interface provides a multi-hop route to the same or a different central unit.

In a fifteenth aspect, alone or in combination with one or more of the first through fourteenth aspects, the first parent node and the second parent node are the same parent node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node in a wireless multi-hop network, comprising:
    receiving, by the wireless node and from a central unit in the wireless multi-hop network, a configuration indicating that a first wireless interface, between the wireless node and a first parent node of the wireless node, is to be used for a first traffic type and that a second wireless interface, between the wireless node and a second parent node of the wireless node, is to be used for a second traffic type;
    configuring, by the wireless node and based at least in part on the configuration, a first connection, of the wireless node, with the first parent node via the first wireless interface and a second connection, of the wireless node, with the second parent node via the second wireless interface; and
    transmitting or receiving, by the wireless node, a communication using the first connection or the second connection based at least in part on a traffic type of the communication.

2. The method of claim 1, wherein the first traffic type is control traffic, has a first quality of service requirement, or a combination thereof; and
    wherein the second traffic type is data traffic, has a second quality of service requirement, or a combination thereof.

3. The method of claim 1, wherein the first wireless interface is a sub-6 gigahertz wireless interface, uses a first frequency range, or a combination thereof; and
    wherein the second wireless interface is a millimeter wave wireless interface, uses a second frequency range that is different than the first frequency range, or a combination thereof.

4. The method of claim 1, wherein the first connection provides a single-hop route to the central unit and the second connection provides a multi-hop route to the same or a different central unit.

5. The method of claim 1, further comprising:
    receiving first control information via the first connection and second control information via the second connection, wherein the first control information conflicts with the second control information; and
    using either the first control information or the second control information based at least in part on a prioritization rule.

6. The method of claim 1, wherein the first traffic type includes downlink control information (DCI) and the second traffic type includes a data communication scheduled by the DCI.

7. The method of claim 6, further comprising:
    receiving the DCI via the first connection;
    determining a set of control parameters, for the data communication, indicated in the DCI; and
    receiving or transmitting the data communication via the second connection based at least in part on the set of control parameters.

8. The method of claim 7, wherein the set of control parameters includes at least one of:
    a time domain resource allocation for the data communication,
    a frequency domain resource allocation for the data communication,
    a modulation and coding scheme for the data communication,
    a beam index to be used for the second connection to receive or transmit the data communication,
    a power control parameter associated with the data communication, or
    a combination thereof.

9. The method of claim 7, wherein the set of control parameters indicated in the DCI is a first set of control parameters for the data communication, and wherein a second set of control parameters for the data communication is indicated in the configuration, is received via the second connection, or a combination thereof.

10. The method of claim 1, wherein the first traffic type includes at least one of:
    acknowledgement or negative acknowledgment feedback corresponding to a communication received via the second connection,
    a scheduling request to schedule a data transmission via the second connection,
    an integrated access and backhaul resource configuration for resources of the second connection,
    an indication of upcoming ultra-reliable low latency communication (URLLC) traffic via the second connection,
    a command to change an operating mode of the wireless node,
    a command to send a paging signal,
    a command to update a configuration of the wireless node,
    a command to perform a network procedure,
    a command to send a status report, or
    a combination thereof.

11. The method of claim 1, wherein the first parent node and the second parent node are the same parent node.

12. A method of wireless communication performed by a central unit in a wireless multi-hop network, comprising:
    configuring, by the central unit, a first topology and a second topology for the wireless multi-hop network, wherein the first topology includes a first wireless interface, between a wireless node and a first parent node of the wireless node, for a first traffic type, and wherein the second topology includes a second wireless interface, between the wireless node and a second parent node of the wireless node, for a second traffic type; and
    transmitting, by the central unit and to the wireless node, a configuration indicating that the first wireless interface is to be used for the first traffic type and that the second wireless interface is to be used for the second traffic type.

13. The method of claim 12, wherein the first wireless interface provides a single-hop connection between the wireless node and the central unit and the second wireless interface provides a multi-hop connection that includes:
   a connection between the second parent node and the same or a different central unit, and
   a connection between the second parent node and the wireless node.

14. The method of claim 12, wherein the first traffic type is control traffic, has a first quality of service requirement, includes downlink control information (DCI), or a combination thereof; and
   wherein the second traffic type is data traffic, has a second quality of service requirement, includes a data communication scheduled by the DCI, or a combination thereof.

15. The method of claim 12, wherein the first wireless interface is a sub-6 gigahertz wireless interface, uses a first frequency range, or a combination thereof; and
   wherein the second wireless interface is a millimeter wave wireless interface, uses a second frequency range that is different than the first frequency range, or a combination thereof.

16. The method of claim 12, wherein the central unit is the first parent node.

17. A method of wireless communication performed by a first parent node in a wireless multi-hop network, comprising:
   receiving, by the first parent node and from a central unit in the wireless multi-hop network, a configuration indicating that a first wireless interface, between the first parent node and a child node of the first parent node, is to be used for a first traffic type and that a second wireless interface, between the child node and a second parent node of the child node, is to be used for a second traffic type;
   configuring, by the first parent node and based at least in part on the configuration, a connection, of the first parent node, with the child node via the first wireless interface; and
   transmitting or receiving, by the first parent node, a communication using the connection with the child node based at least in part on a traffic type of the communication.

18. The method of claim 17, further comprising configuring a connection with the second parent node based at least in part on the configuration.

19. The method of claim 17, wherein the first wireless interface is a sub-6 gigahertz wireless interface, uses a first frequency range, or a combination thereof; and
   wherein the second wireless interface is a millimeter wave wireless interface, uses a second frequency range that is different than the first frequency range, or a combination thereof.

20. The method of claim 17, wherein the first traffic type includes control information and the second traffic type includes a data communication scheduled by the control information.

21. The method of claim 20, wherein transmitting or receiving the communication using the connection with the child node comprises transmitting or receiving the control information via the connection with the child node.

22. The method of claim 20, further comprising transmitting or receiving the control information via a connection with the second parent node based at least in part on the configuration.

23. The method of claim 20, wherein transmitting or receiving the communication using the connection with the child node comprises transmitting the control information via the connection with the child node; and
   wherein the method further comprises transmitting the control information via a connection with the second parent node to instruct the second parent node to transmit the data communication to the child node or to receive the data communication from the child node.

24. The method of claim 23, wherein the control information transmitted to the wireless node and the second parent node is a single broadcast communication.

25. The method of claim 20, further comprising receiving the control information via a connection with the second parent node; and
   wherein transmitting or receiving the communication using the connection with the child node comprises transmitting the control information via the connection with the child node based at least in part on receiving the control information via the connection with the second parent node.

26. The method of claim 17, wherein the first traffic type includes a data communication, has a first quality of service requirement, or a combination thereof; and
   wherein the second traffic type includes control information that schedules the data communication, has a second quality of service requirement, or a combination thereof.

27. The method of claim 26, wherein transmitting or receiving the communication using the connection with the child node comprises transmitting or receiving the data communication via the connection with the child node.

28. The method of claim 26, further comprising transmitting or receiving the control information via a connection with the second parent node based at least in part on the configuration.

29. The method of claim 17, wherein the first wireless interface provides a single-hop route to the central unit and the second wireless interface provides a multi-hop route to the same or a different central unit.

30. A wireless node in a wireless multi-hop network for wireless communication, comprising:
   a memory; and
   one or more processors operatively coupled to the memory, the memory and the one or more processors configured to:
      receive, from a central unit in the wireless multi-hop network, a configuration indicating that a first wireless interface, between the wireless node and a first parent node of the wireless node, is to be used for a first traffic type and that a second wireless interface, between the wireless node and a second parent node of the wireless node, is to be used for a second traffic type;
      configure a first connection, of the wireless node, with the first parent node via the first wireless interface, and a second connection, of the wireless node, with the second parent node via the second wireless interface, based at least in part on the configuration; and transmit or receive a communication using the first connection or the second connection based at least in part on a traffic type of the communication.

* * * * *